(12) United States Patent
Tamura et al.

(10) Patent No.: US 9,421,708 B2
(45) Date of Patent: Aug. 23, 2016

(54) BLOW MOLDING DEVICE

(71) Applicant: Discma AG, Hunenberg (CH)

(72) Inventors: Nobuyuki Tamura, Tokyo (JP);
Shigeki Morikami, Tokyo (JP);
Shinichi Tabata, Tokyo (JP)

(73) Assignee: Discma AG, Hunenberg (CH)

( * ) Notice: Subject to any disclaimer, the term of this patent is extended or adjusted under 35 U.S.C. 154(b) by 10 days.

(21) Appl. No.: 14/389,616

(22) PCT Filed: Jan. 22, 2013

(86) PCT No.: PCT/JP2013/000291
§ 371 (c)(1),
(2) Date: Sep. 30, 2014

(87) PCT Pub. No.: WO2013/145511
PCT Pub. Date: Oct. 3, 2013

(65) Prior Publication Data
US 2015/0110915 A1    Apr. 23, 2015

(30) Foreign Application Priority Data

Mar. 30, 2012    (JP) .................................. 2012-081296

(51) Int. Cl.
*B29C 49/46* (2006.01)
*B29C 49/58* (2006.01)
(Continued)

(52) U.S. Cl.
CPC .............. *B29C 49/28* (2013.01); *B29C 49/46* (2013.01); *B29C 49/58* (2013.01); *B29C 49/06* (2013.01);
(Continued)

(58) Field of Classification Search
CPC .......... B29C 49/58; B29C 2049/5803; B29C 2049/465; B29C 2049/4655; B29C 2049/4664
See application file for complete search history.

(56) References Cited

U.S. PATENT DOCUMENTS 3,993,427 A  *  11/1976  Kauffman et al. ............. 425/529
4,196,165 A  *   4/1980  Michel .......................... 264/530
(Continued)

FOREIGN PATENT DOCUMENTS

GB         2064421 A   *   6/1981
JP         A-56-13141       2/1981
(Continued)

OTHER PUBLICATIONS

International Preliminary Report on Patentability issued in International Application No. PCT/JP2013/000291 on Oct. 1, 2014 (with translation).

(Continued)

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

To effectively prevent occurrence of stretching unevenness during blow molding using a liquid as the pressure medium without significantly modifying the structure of a device, provided is a blow molding device including: a metal mold used for blow molding; and a blow nozzle that tightly communicates with a mouth tubular portion of a bottomed tubular preform, the liquid as the pressure medium being supplied into the preform through the blow nozzle. The blow nozzle is provided, at a lower end portion thereof, with an engaging tubular piece that is inserted into the mouth tubular portion, and the engaging tubular piece has a length by which a lower end of the engaging tubular piece extends further downward than a neck ring in a state where the blow nozzle is in communication with the mouth tubular portion, the neck ring being provided around a lower end of the mouth tubular portion.

4 Claims, 2 Drawing Sheets

(51) Int. Cl.
  *B29C 49/28*   (2006.01)
  *B29C 49/12*   (2006.01)
  *B29L 31/00*   (2006.01)
  *B29C 49/06*   (2006.01)
  *B29C 49/42*   (2006.01)

(52) U.S. Cl.
  CPC ........ *B29C 49/12* (2013.01); *B29C 2049/4294* (2013.01); *B29C 2049/4664* (2013.01); *B29C 2049/5803* (2013.01); *B29L 2031/7158* (2013.01)

(56) References Cited

U.S. PATENT DOCUMENTS

| | | | | |
|---|---|---|---|---|
| 4,214,860 | A | * | 7/1980 | Kleimenhagen et al. .... 425/149 |
| 5,711,913 | A | * | 1/1998 | Seki et al. .................... 264/532 |
| 6,485,669 | B1 | * | 11/2002 | Boyd et al. ................... 264/521 |
| 2004/0121038 | A1 | | 6/2004 | Seki et al. |

FOREIGN PATENT DOCUMENTS

| | | | |
|---|---|---|---|
| JP | 60-62923 U | * | 5/1985 |
| JP | H11179793 A | | 7/1999 |
| JP | A-2000-43129 | | 2/2000 |
| JP | 2001071375 A | | 3/2001 |
| JP | A-2003-103615 | | 4/2003 |
| JP | A-2003-251685 | | 9/2003 |

OTHER PUBLICATIONS

International Search Report issued in International Application No. PCT/JP2013/000291 on May 7, 2013 (with translation).

* cited by examiner

BLOW MOLDING DEVICE

TECHNICAL FIELD

The present invention relates to a device for blow molding a synthetic resin bottle, the device using a liquid as a pressure medium.

BACKGROUND ART

With their numerous excellent characteristics, numerous blow molded bottles, in particular, bottles (so-called pet bottles) that are made of polyethylene terephthalate (PET) resin and molded by biaxial stretch blow molding are heavily used as bottle containers in a variety of fields.

Containers of such a kind are generally molded with use of a preform that has been inject-molded into a bottomed tubular shape like a test tube. In a state where the preform is heated to a temperature at which a stretching effect is achieved, the preform is vertically stretched in an axis direction by means of a stretching rod and is inflated and stretched by means of blow air injected into the preform through a blow nozzle fitted tightly to a mouth tubular portion of the preform.

On the other hand, Patent Literature 1 describes an invention directed to a method for molding a plastic bottle in which a preform is blow molded by means of a liquid supplied as the pressure medium through the blow nozzle instead of air. According to the blow molding method described in Patent Literature 1, when the liquid used as the pressure medium is water, tea, or a refreshing drink that is to be filled in the bottle as the product, the process of filling the liquid product may be omitted, and a production line may be simplified.

CITATION LIST

Patent Literature

PTL 1: JP2000043129A

SUMMARY OF THE INVENTION

Technical Problems

In blow molding using a liquid as the pressure medium, when, for example, a pet bottle is molded, a bottomed tubular preform that has a test tube shape and that is made of a PET resin, except for the mouth tubular portion of the preform, is preheated to a temperature of substantially 100° C. to 120° C. that is suitable for stretch blow molding. Then, a pressurized liquid is supplied into the preform through the blow nozzle so as to inflate and stretch the preform, thus shaping the bottle.

Liquid has greater heat capacity and greater heat conductivity with a preform than air, and depending on the temperature of the liquid supplied, the temperature of a circumferential wall of the preform is partly decreased. Accordingly, stretching unevenness occurs, resulting in the presence of non-uniform stretching ratio and thickness distribution and the appearance of residual strain in the circumferential wall of the bottle that is molded. As a result, problems such as the deteriorated stiffness, buckling strength, and heat resistance of the bottle, and the deformation of the molded bottle, might arise. In the extreme case, the preform is perforated with holes or the like during blow molding and may not be molded into a desired size.

In view of the above, the present invention is to effectively prevent the occurrence of stretching unevenness during blow molding using a liquid as the pressure medium without significantly modifying the structure of the device.

Solution to Problems

A first aspect of the present invention for solving the aforementioned problems resides in a blow molding device, including:
 a metal mold used for blow molding; and
 a blow nozzle configured to tightly communicate with a mouth tubular portion of a bottomed tubular preform, a liquid as a pressure medium being supplied into the preform through the blow nozzle, wherein
 the blow nozzle is provided, at a lower end portion thereof, with an engaging tubular piece configured to be inserted into the mouth tubular portion, and
 the engaging tubular piece has a length by which a lower end of the engaging tubular piece extends further downward than a neck ring in a state where the blow nozzle is in communication with the mouth tubular portion, the neck ring being provided around a lower end of the mouth tubular portion.

The present inventors have investigated causes of the occurrence of stretching unevenness and a method for solving stretching unevenness and found that the main cause of stretching unevenness is that a large amount of liquid as the pressure medium that is ejected and supplied into the preform through the blow nozzle continuously collides with the circumferential wall located near right below the neck ring, and that the circumferential wall region is rapidly cooled from the temperature to which the preform is preheated for stretching. Thus, the present inventors have conceived the aforementioned structure, in particular, the structure of the blow nozzle.

According to the aforementioned structure, the engaging tubular piece has the length by which the lower end of the engaging tubular piece extends further downward than the neck ring in the state where the blow nozzle is in communication with the mouth tubular portion, the neck ring being provided around the lower end of the mouth tubular portion. Accordingly, combined with an advantageous effect, obtained by the long engaging tubular piece, of flowing and dispensing the liquid straight downward from the blow nozzle to the inside of the preform and preventing the flow of the liquid from spreading in a horizontal direction, the aforementioned structure prevents the supplied liquid from colliding with the circumferential wall located near right below the neck ring, and therefore, prevents and mitigates a rapid decrease in temperature in the circumferential wall region.

The region located near right below the neck ring is a region shaped to be a shoulder portion of the bottle by blow molding, and when the region is rapidly cooled from the preheat temperature, the stretch property is deteriorated, and reduction in thickness due to stretching may not progress in the region shaped to be the shoulder portion of the bottle during shaping of the bottle, and accordingly, so-called material distribution from the above region to a region shaped to be a trunk portion and a bottom portion of the bottle is deteriorated. Consequently, the circumferential wall corresponding to the trunk portion and the bottom portion of the bottle may not be provided with a predetermined thickness, i.e., is reduced in thickness, and desired stiffness and buckling strength may not be achieved. However, with the aforementioned structure, the rapid decrease in temperature near right below the neck ring is prevented, and therefore, the deterioration in material distribution from the region shaped to be the shoulder portion of the bottle to the region shaped to be the trunk portion and the bottom portion of the bottle is limited. As a result, the thickness of the circumferential wall in the region corresponding to the trunk portion and the bottom portion falls within an assumed range.

Furthermore, since the thickness of the circumferential wall in the region corresponding to the trunk portion and the bottom portion falls within the assumed range, there is no need for further increasing the thickness of the preform for the purpose of achieving the desired stiffness and buckling strength. As a result, weight reduction of the bottle is achieved. Moreover, the mouth tubular portion of the preform may be out of direct contact with the liquid, and accordingly, the mouth tubular portion is prevented from being deformed under pressure of the pressurized liquid. Meanwhile, the extent of the length of the engaging tubular piece may be appropriately determined in consideration of conditions of blow molding or the like, including the degree of material distribution from the region corresponding to the shoulder portion to the region corresponding to the trunk portion and the bottom portion, the shape of the preform, and productivity, as long as the lower end of the engaging tubular piece extends further downward than the neck ring that is provided around the lower end of the mouth tubular portion. For example, the length of the engaging tubular piece may be substantially 5 mm to 15 mm in order to achieve the advantageous effect. It should be noted, however, as the larger the length is, the more difficult it becomes to detach the nozzle from the mouth portion, it is preferable to determine an optimal range in consideration of the aforementioned various conditions.

A second aspect of the present invention resides in the blow molding device according to the first aspect, wherein
the blow nozzle is provided, on an outer circumferential wall thereof, with a circumferential stepped portion whose diameter is decreased toward a bottom thereof, and the blow nozzle is brought into the tight communication with the mouth tubular portion as a result of abutment between the circumferential stepped portion and an upper end surface of the mouth tubular portion via a seal member.

The above structure concerns a way of sealing for bringing the blow nozzle into the tight communication with the mouth tubular portion. With the above structure, sealing performance is reliably maintained despite simplicity in structure, and the preform may be fitted or released from the fitting quickly. Besides, maintenance including exchange of the seal member may be easily implemented. Of course, the above structure concerning the way of sealing is merely an example, and any appropriate way of sealing may be adopted in consideration of sealing performance, productivity, or the like.

A third aspect of the present invention resides in the blow molding device according to the first or the second aspect, wherein
a stretching rod used for vertical stretching is inserted and disposed in the blow nozzle.

Advantageous Effects of Invention

With the aforementioned structure where the engaging tubular piece has the length by which the lower end of the engaging tubular piece extends further downward than the neck ring that is provided around the lower end of the mouth tubular portion of the preform, the blow molding device according to the present invention is capable of preventing the liquid supplied into the preform from colliding with the circumferential wall located near right below the neck ring, and therefore, is capable of preventing and mitigating the rapid decrease in temperature in the circumferential wall region. Accordingly, the deterioration in material distribution from the region shaped to be the shoulder portion of the bottle to the region shaped to be the trunk portion and the bottom portion of the bottle is limited, and the thickness of the circumferential wall in the region corresponding to the trunk portion and the bottom portion falls within the assumed range. As a result, the bottle, although with an assumed weight, having the desired stiffness and buckling strength is achieved.

DESCRIPTION OF EMBODIMENTS

An embodiment of the present invention will be described with reference to examples and the drawings.

Figure 1:
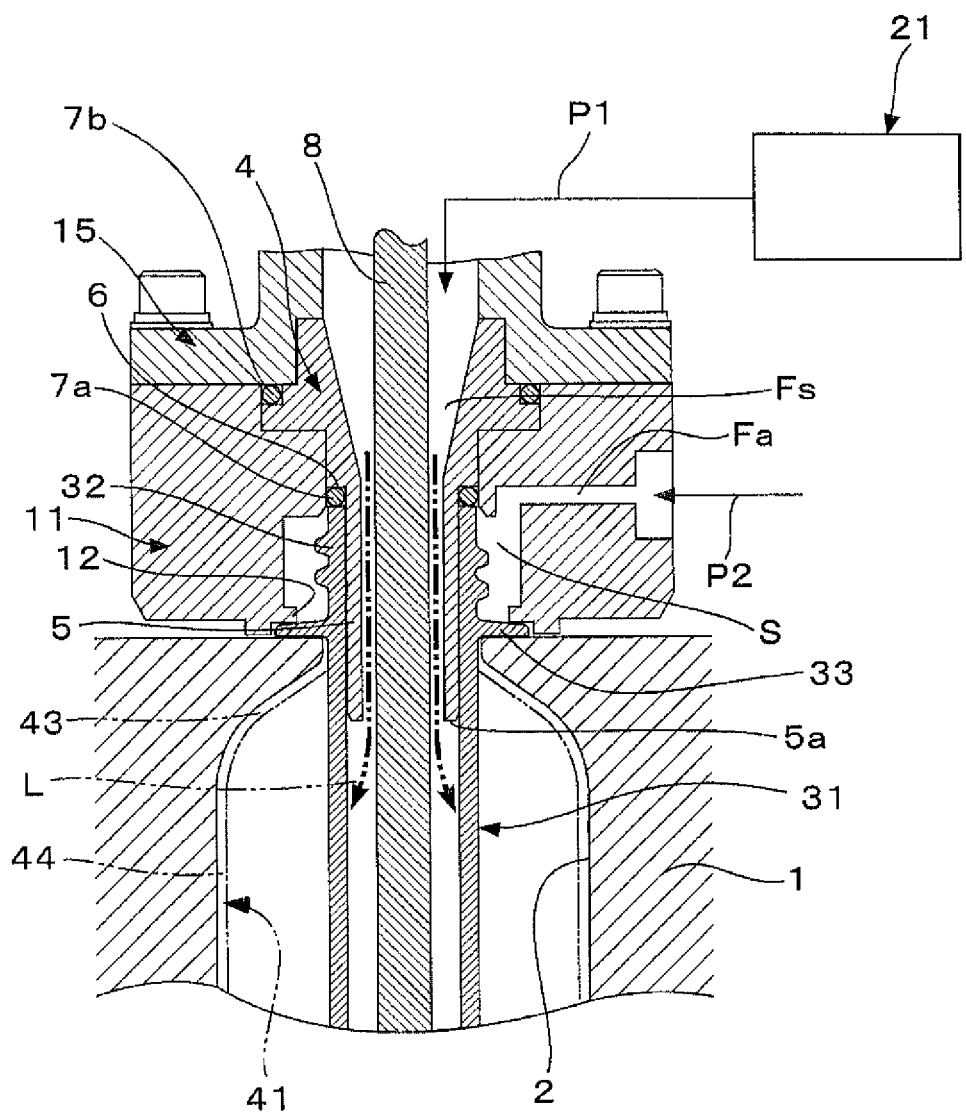
FIG. 1 is a sectional view illustrating a part of a device according to one embodiment of the present invention.

FIG. 1 is a sectional view illustrating a part of a blow molding device according to one embodiment of the present invention in a state where a preform 31 is fitted to a metal mold 1 used for blow molding. The entire preform 31 has a bottomed cylindrical test tube shape. The preform 31 includes a mouth tubular portion 32 standing from an upper end portion of the preform 31, and the mouth tubular portion 32 is provided, on an outer circumferential wall of a lower end portion thereof, with a neck ring 33. The preform 31 is fitted in the metal mold 1, with the mouth tubular portion 32 being projected to an outside (upward in FIG. 1).

The part of the device includes the metal mold 1, a partition wall member 11, a blow nozzle 4, a stretching rod 8, and a fixing block 15. As auxiliary equipment, a pressurized liquid supply device 21 is also provided to supply a pressurized liquid L used as a pressure medium for blow molding. The pressurized liquid supply device 21 may consist of a pressurizing device and a compressor serving as a power source for the pressurizing device. The pressurizing device is in the form of, for example, a plunger pump, or includes a cylinder with a built-in piston that includes two compartments.

As far as the illustrated part is concerned, the partition wall member 11 is provided above the metal mold 1 such that the partition wall member 11 surrounds the outer circumferential surface of the mouth tubular portion 32 of the preform 31 projected upward of the metal mold 1 via the space S. The partition wall member 11 also includes a support flange piece 12 provided around a lower end portion of the partition wall member 11, and the support flange piece 12 tightly abuts against the neck ring 33 of the preform 31 from above so as to maintain a fitted position of the preform 31. The part of the device also includes an introduction path Fa for pressurized air that is later described.

The blow nozzle 4 is a member that constitutes a supply path Fs for supplying, to an inside of the preform 31, the liquid L as the pressure medium that is supplied from the pressurized liquid supply device 21. The blow nozzle 4 according to the present embodiment has a tapered tubular shape including an upper portion whose diameter increases toward a top thereof, and is provided, at a lower end portion thereof, with a cylindrical engaging tubular piece 5. The blow nozzle 4 includes a circumferential stepped portion 6 provided around an outer circumferential wall of the blow nozzle 4, the circumferential stepped portion 6 having a diameter decreased toward a bottom thereof. The engaging tubular piece 5 is loosely engaged into the mouth tubular portion 32 of the preform 31, and as a result of abutment between the circumferential stepped portion 6 and an upper end surface of the mouth tubular portion 32 via a seal member (an O-ring) 7a, the blow nozzle 4 is tightly connected with the mouth tubular portion 32 of the preform 31. The engaging tubular piece 5 may be inserted with a gap provided between the engaging tubular piece 5 and the mouth tubular portion 32.

In the state where the blow nozzle 4 is tightly connected with the mouth tubular portion 32 of the preform 31 as described above, a lower end 5a of the engaging tubular piece 5 extends further downward than the neck ring 33 provided around the lower end of the mouth tubular portion 32. That is to say, the engaging tubular piece 5 has a length by which the lower end of the engaging tubular piece 5 extends further downward than the neck ring 33 into a region of the mold 1 defining a shoulder portion 43, seen in FIG. 1, in the state where the blow nozzle 4 is in communication with the mouth of the tubular portion 32.

The fixing block 15 is a member used for assembling and fixing the blow nozzle 4 to the partition wall member 11. Between the fixing block 15 and the blow nozzle 4, a seal member 7b is also provided. In the supply path Fs included in the blow nozzle 4, the stretching rod 8 is coaxially inserted and disposed. By driving the stretching rod 8 downward by means of an actuator (which is not illustrated) while a tip portion of the stretching rod 8 is in abutment with an inner circumferential surface of a bottom portion (which is not illustrated) of the preform 31, the preform 31 is vertically stretched. Depending on conditions of blow molding, the stretching rod 8 may be omitted.

Figure 2:
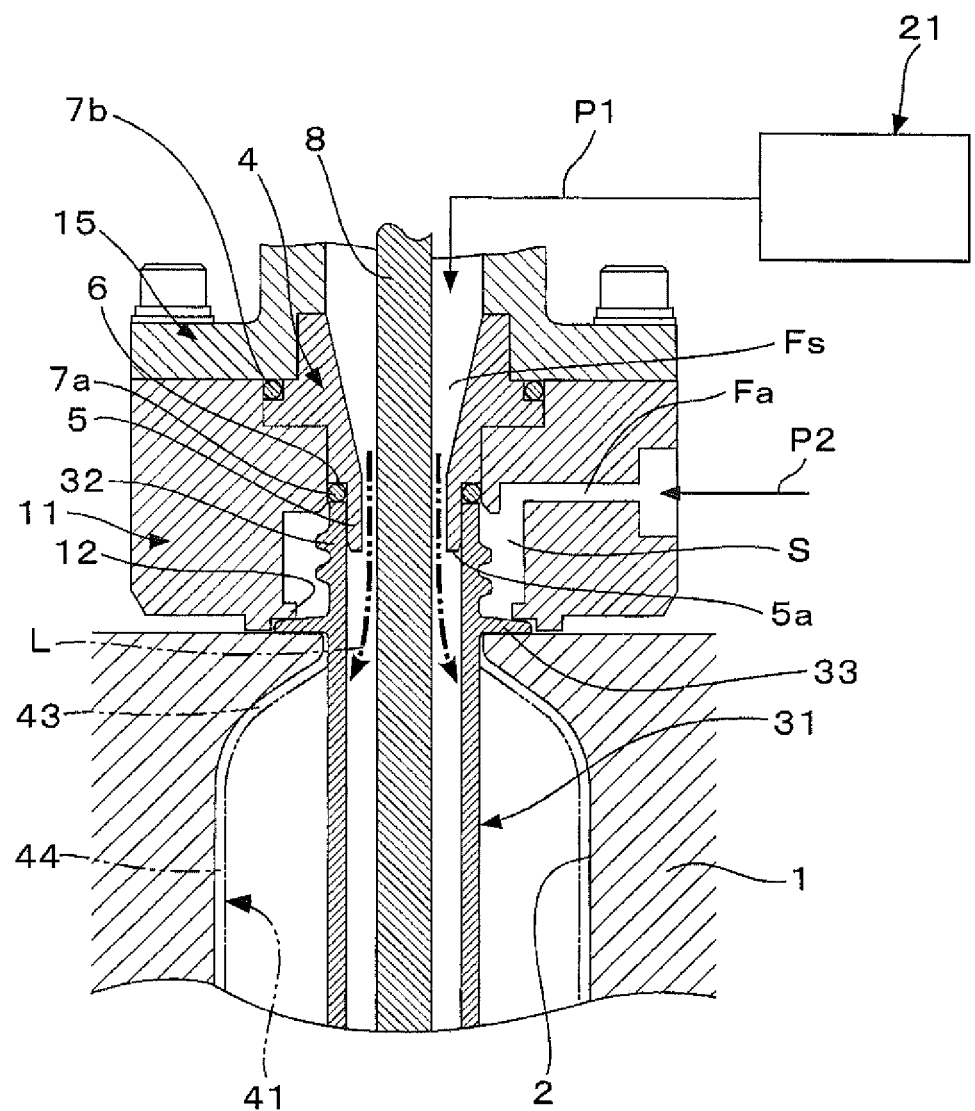
FIG. 2 is a sectional view illustrating a part of a comparative device.

FIG. 2 is a sectional view illustrating a part of a device according to a comparative example of the device of the embodiment illustrated in FIG. 1. The device according to the comparative example has substantially the same structure as the device according to the embodiment illustrated in FIG. 1 except for that the engaging tubular piece 5 provided in the blow nozzle 4 has a smaller length by which the lower end 5a is located at an upper end portion of the mouth tubular portion 32.

Next, a description is given of an outline of a method for molding a bottle by biaxial stretch blow molding using the blow molding devices illustrated in FIGS. 1 and 2.

The following are molding processes (1)-(6).

(1) The preform 31 which is heated to a temperature suitable for biaxial stretch blow molding is fitted to the metal mold 1 used for blow molding, with the mouth tubular portion 32 being projected upward, and mold closing is performed.

(2) The partition wall member 11, the blow nozzle 4, and the fixing block 15, which are assembled and fixed, are displaced downward from above the mouth tubular portion 32, and the engaging tubular piece 5 provided in the blow nozzle 4 is inserted into the mouth tubular portion 32. At this time, the support flange piece 12 provided in the partition wall member 11 abuts against the neck ring 33 of the preform 31, and the circumferential stepped portion 6 provided in the blow nozzle 4 abuts against the upper end surface of the mouth tubular portion 32 via the seal member 7a. Thus, the fitted position of the preform 31 is secured. The stretching rod 8 is also inserted and coaxially disposed in the blow nozzle 4.

(3) The preform 31 is vertically stretched by means of the stretching rod 8.

(4) After or simultaneously with the above vertical stretching, the pressurized liquid L is supplied from the pressurized liquid supply device 21 to the inside of the preform 31 through a pipe P1 and the blow nozzle 4. By doing so, the preform 31 is inflated and stretched, and a bottle 41 is shaped in accordance with a cavity 2 of the metal mold 1 as indicated by a two-dot chain line in FIG. 1.

(5) After the bottle 41 is shaped, the supply of the pressurized liquid L is stopped. Then, the partition wall member 11, the blow nozzle 4, and the fixing block 15, which are assembled and fixed, are displaced above the mouth tubular portion 32, and the stretching rod 8 is pulled out.

(6) The metal mold 1 is then opened, and the bottle 41 is detached to extract the bottle 41 filled with the liquid L. Then, the mouth tubular portion 32 is sealed with a cap to obtain a product.

Reference is made to the process (4) of supplying the liquid L to the inside of the preform 31 through the blow nozzle 4. In the device according to the comparative example illustrated in FIG. 2, the length of the engaging tubular piece 5 is smaller, and the lower end 5a of the engaging tubular piece 5 is located at the upper end portion of the month tubular portion 32. Accordingly, as indicated by an arrow two-dot chain line in FIG. 2, the liquid L, which is dispensed into the mouth tubular portion 32 through the supply path Fs included in the blow nozzle 4 and through a cylindrical flow path formed by the engaging tubular piece 5 and the stretching rod 8, is filled into the preform 31 while colliding with the circumferential wall near right below the neck ring 33. As a result, the circumferential wall located near right below the neck ring 33 undergoes a rapid decrease in temperature. At this time, the liquid L is likely to be filled along the inner circumferential surface of the preform 31.

The region located near right below the neck ring 33 is a region shaped to be a shoulder portion 43 of the bottle 41, and reduction in thickness due to stretching may not progress in the region shaped to be the shoulder portion 43 of the bottle 41 during shaping of the bottle 41, and accordingly, so-called material distribution from the above region to a region shaped to be a trunk portion 44 and a bottom portion (which is not illustrated) of the bottle 41 is deteriorated. Consequently, the circumferential wall in the region corresponding to the trunk portion 44 and the bottom portion of the bottle 41 may not be provided with a predetermined thickness, i.e., is reduced in thickness, and desired stiffness and buckling strength may not be achieved.

In contrast, in the device according to the embodiment illustrated in FIG. 1, the length of the engaging tubular piece 5 is larger, and the lower end 5a of the engaging tubular piece 5 is located further downward than the neck ring 33. Combined with the advantageous effect, obtained by the long engaging tubular piece 5, of flowing and dispensing the liquid L straight downward and preventing the flow of the liquid L from spreading in the horizontal direction, the above structure allows the liquid L, which is discharged into the mouth tubular portion 32 through the supply path Fs included in the blow nozzle 4 and through the cylindrical flow path formed by the engaging tubular piece 5 and the stretching rod 8, to be dispensed as indicated by an arrow two-dot chain line in FIG. 1. Accordingly, the liquid L is prevented from colliding with the region located near right below the neck ring 33, that is to say, the region shaped to be the shoulder portion 43 of the bottle 41. Consequently, the deterioration in material distribution from the region shaped to be the shoulder portion 43 of the bottle 41 to the region shaped to be the trunk portion 44 and the bottom portion of the bottle 41 is limited. As a result, the thickness of the circumferential wall in the region corresponding to the trunk portion 44 and the bottom portion falls within the assumed range.

In addition, when the mouth tubular portion 32 is inflated and deformed by the liquid L filled inside the bottle 41 during or after shaping of the bottle 41, the deformation of the mouth tubular portion 32 may be prevented by supplying pressurized air to space S through a pipe P2 and the introduction path Fa. However, in the structure according to the embodiment illustrated in FIG. 1, since the engaging tubular piece 5 extends further downward than the neck ring 33 while being substantially fitted into the mouth tubular portion 32 (possibly with a gap of, for example, 0-0.5 mm, preferably 0.2 mm or less), the deformation of the mouth tubular portion 32 by the liquid L is effectively prevented without supplying pressurized air to the space S.

Although the structure and advantageous effects of the blow molding device according to the present invention have been described in accordance with the embodiment, the present invention is not limited to the above embodiment. For example, the device according to the embodiment of the present invention is suitable for molding a bottle made of a synthetic resin such as PET resin, polypropylene resin, or the like, by biaxial stretch blow molding. However, the device according to the present invention is not limited to biaxial stretch blow molding and may be used for blow molding in which preforms are inflated and deformed to be shaped into containers in a general manner. Furthermore, the stretching rod may be omitted. Moreover, the structure according to the embodiment includes a basic structure for blow molding using a liquid as the pressure medium, and auxiliary equipment or a mechanism for controlling the molding processes may be additionally provided when necessary.

INDUSTRIAL APPLICABILITY

As described above, the blow molding device according to the present invention is capable of effectively preventing the occurrence of stretching unevenness during blow molding using a liquid as the pressure medium without significantly modifying the structure of an existing device and is expected to be widely used in the field of blow molding using a liquid as the pressure medium.

REFERENCE SIGNS

1; metal mold
2; cavity
4; blow nozzle
5; engaging tubular piece
5a; lower end
6; circumferential stepped portion
7a, 7b; seal member
8; stretching rod
11; partition wall member
12; support flange piece
15; fixing block
21; pressurized liquid supply device
Fa; introduction path
Fs; supply path
L; liquid
P1, P2; pipe
S; space
31; preform
32; mouth tubular portion
33; neck ring
41; bottle
43; shoulder portion
44; trunk portion

The invention claimed is:

1. A blow molding device, comprising:
a metal mold used for blow molding, the metal mold including portions defining a shoulder portion; and
a blow nozzle configured to tightly communicate with a mouth tubular portion of a bottomed tubular preform, a liquid as a pressure medium coupled to the blow nozzle so as to be provided into the preform through the blow nozzle, wherein
the blow nozzle is provided, at a lower end portion thereof, with an engaging tubular piece configured to be inserted into the mouth tubular portion, and
the engaging tubular piece has a length by which a lower end of the engaging tubular piece extends further downward than a neck ring and into a region of the metal mold having the portions defining the shoulder portion in a state where the blow nozzle is in communication with the mouth tubular portion, the neck ring being provided around a lower end of the mouth tubular portion.

2. The blow molding device according to claim 1, wherein the blow nozzle is provided, on an outer circumferential wall thereof, with a circumferential stepped portion whose diameter is decreased toward a bottom thereof, and the blow nozzle is brought into the tight communication with the mouth tubular portion as a result of abutment between the circumferential stepped portion and an upper end surface of the mouth tubular portion via a seal.

3. The blow molding device according to claim 1, wherein a stretching rod used for vertical stretching is inserted and disposed in the blow nozzle.

4. The blow molding device according to claim 2, wherein a stretching rod used for vertical stretching is inserted and disposed in the blow nozzle.

* * * * *